Inventors:
Wilbur A. Schmall,
Alfred E. DeMott,
Paul M. Kropp, Jr.
by Armand Cipelli
Their Attorney.

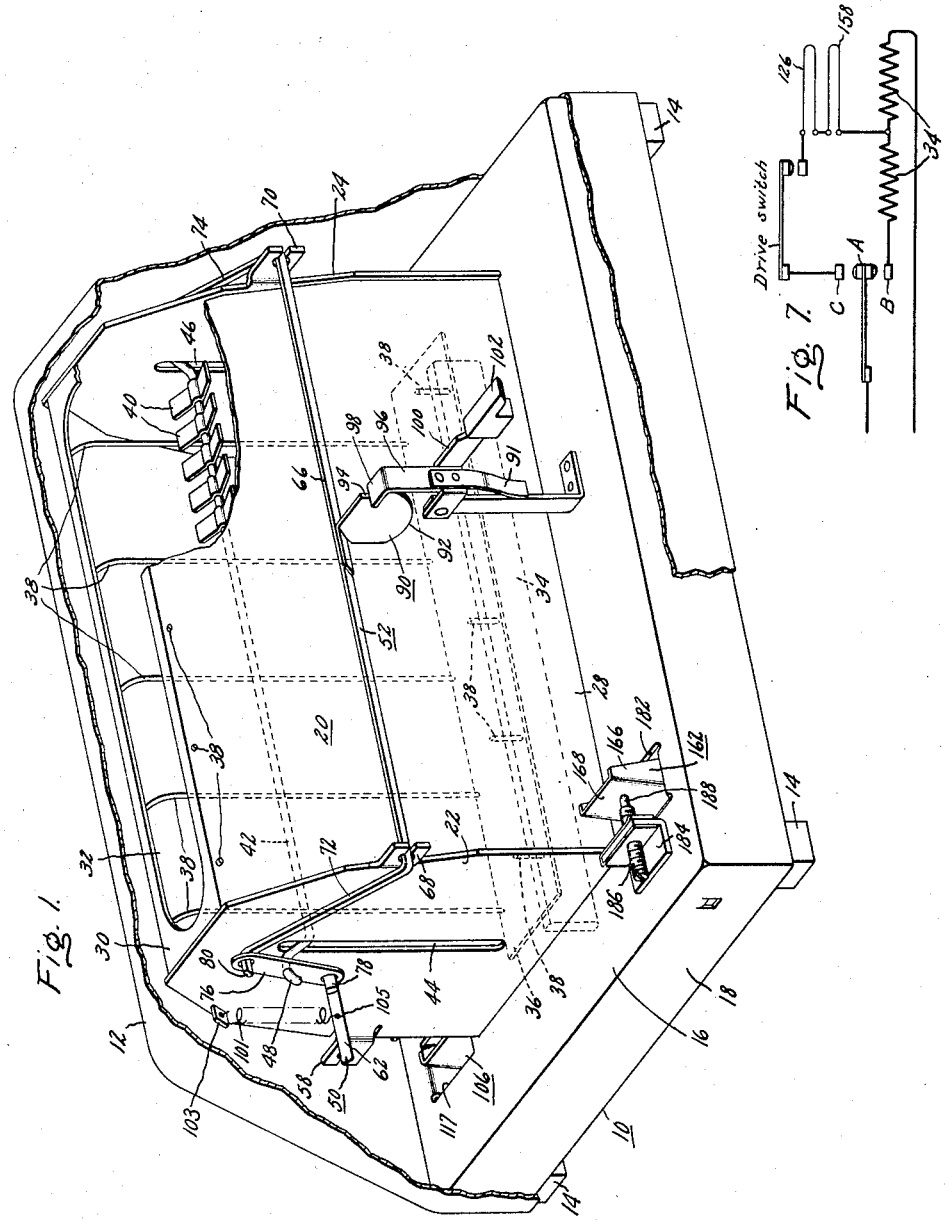

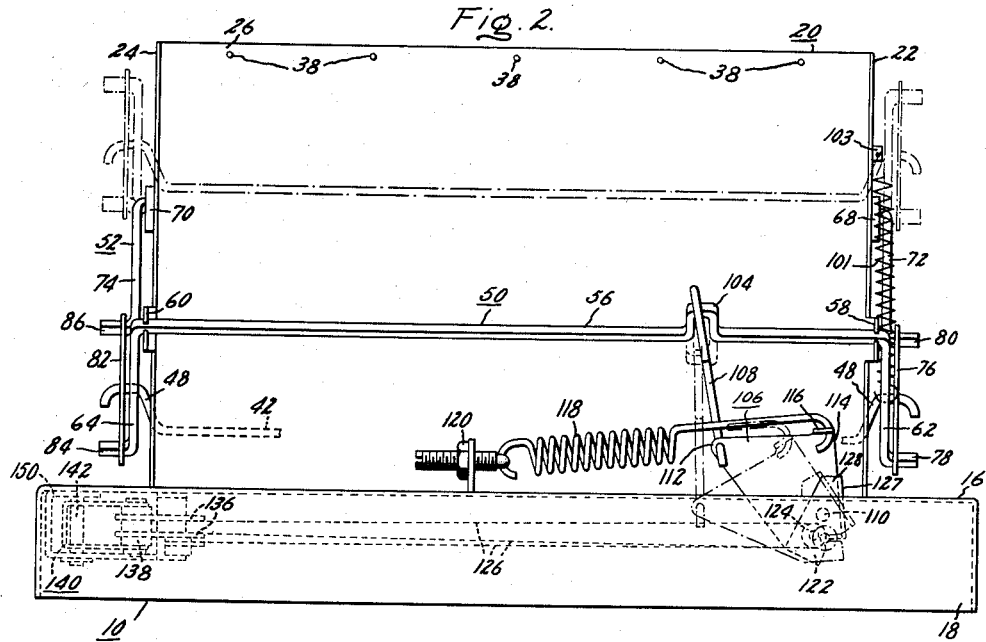

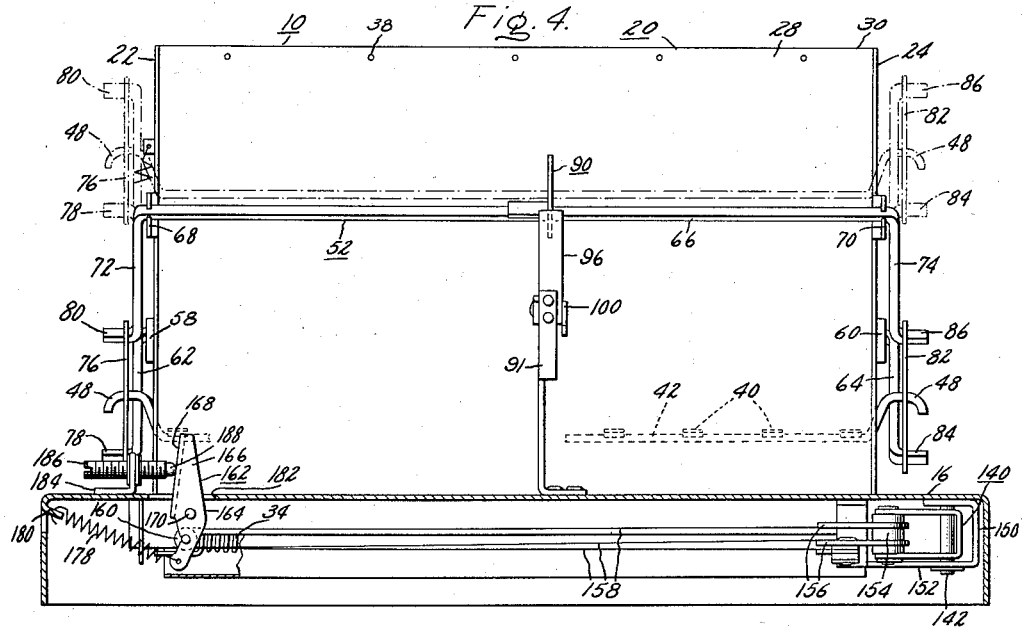
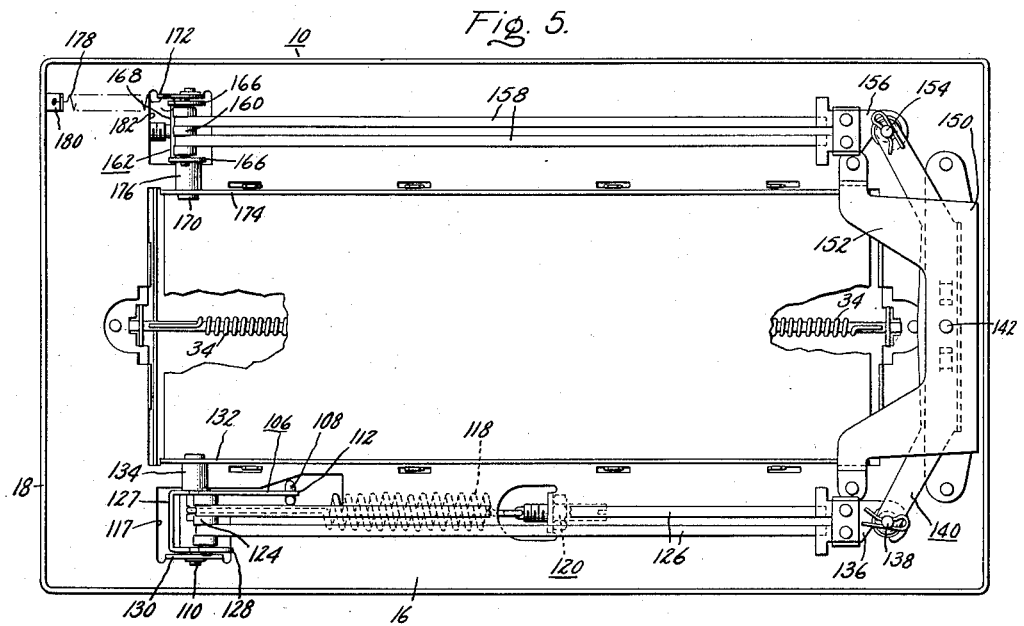

United States Patent Office

2,920,550
Patented Jan. 12, 1960

2,920,550

ELECTRIC TOASTER

Wilbur A. Schmall, Alfred E. De Mott, and Paul M. Kropp, Jr., Allentown, Pa., assignors to General Electric Company, a corporation of New York Application March 27, 1957, Serial No. 648,901

15 Claims. (Cl. 99—329)

The instant invention relates to electric toasters, particularly to an improved means for actuating movement of the bread supporting means therein, and more particularly to an improvement in such actuating means of the "hot wire" drive type. For the purposes of this patent application, a "hot wire" drive is one which includes a thermally responsive, expansible and contractible means, the motion of which causes or allows movement of the bread supporting means.

Most contemporary toasters are of the so-called "pop-up" type. This type of toaster generally comprises an arrangement wherein toast is inserted into the toaster and moved from an upper, non-toasting position to a lower, toasting position, where the bread supporting means is releasably latched, by the manual movement of a handle. During movement of the bread supporting means to its lower position, a spring is normally acted on to store energy. Upon completion of toasting the bread, the bread supporting means is unlatched by a timer or the like, and returned to its upper position by the energy stored in the spring. As is the case in most household appliances, the toaster art recently has expended much effort in the direction of making toasters more automatic than they have been heretofore. Therefore, it is extremely desirable that an automatic toaster be provided which will perform a complete toasting cycle with less effort than heretofore required, for example, as by placing the bread into the toaster and pressing a pushbutton or the like.

It is an object of this invention to provide an improved automatic electric toaster wherein the entire toasting cycle is automatically effected simply by placing a slice of bread into the toaster and depressing a pushbutton or the like.

It is a further object of this invention to provide in an automatic electric toaster an improved "hot wire" drive for the bread supporting means.

The objects of this invention are accomplished in one form by the provision in an automatic electric toaster of a "hot wire" drive which includes a generally linearly movable member which actuates bread supporting means to raise the latter from a lower, toasting position to an upper, non-toasting position, and a thermally responsive, expansible and contractible means in the form of thermomotive members of the ribbon type associated with a mechanical assemblage of parts including a stored energy mechanism, in the form of a coil spring which is normally stressed when the ribbons are cold and taut, and which mechanism causes movement of the linearly movable, actuating member when the ribbons expand in response to being heated at the appropriate time to raise the bread supporting means.

The above and other objects and further details of that which we believe to be novel and our invention will be clear from the following description and claims taken with the accompanying drawings wherein:

Fig. 1 is a perspective view of an electric toaster incorporating the instant invention, showing the outer shell and other portions thereof broken away and shown in section for the purpose of clarity;

Fig. 2 is an elevation view of the toaster chassis, i.e., toaster with shell removed, showing one side thereof; the bread supporting means, viz., the bread rack and its supporting mechanism, is illustrated in its upper, non-toasting position in phantom lines, and in its lower, toasting position in solid lines;

Fig. 3 is an elevation view of the toaster chassis showing one end thereof; the bread supporting means being illustrated in its two extreme positions in the same manner as in Fig. 2;

Fig. 4 is a view similar to Fig. 2, but showing the other side of the toaster chassis;

Fig. 5 is an elevation view of the bottom of the toaster chassis, showing some parts broken away for the sake of clarity; this view shows most of the improved "hot wire" drive structure;

Fig. 7 is a wiring diagram of the toaster.

Figure 6:
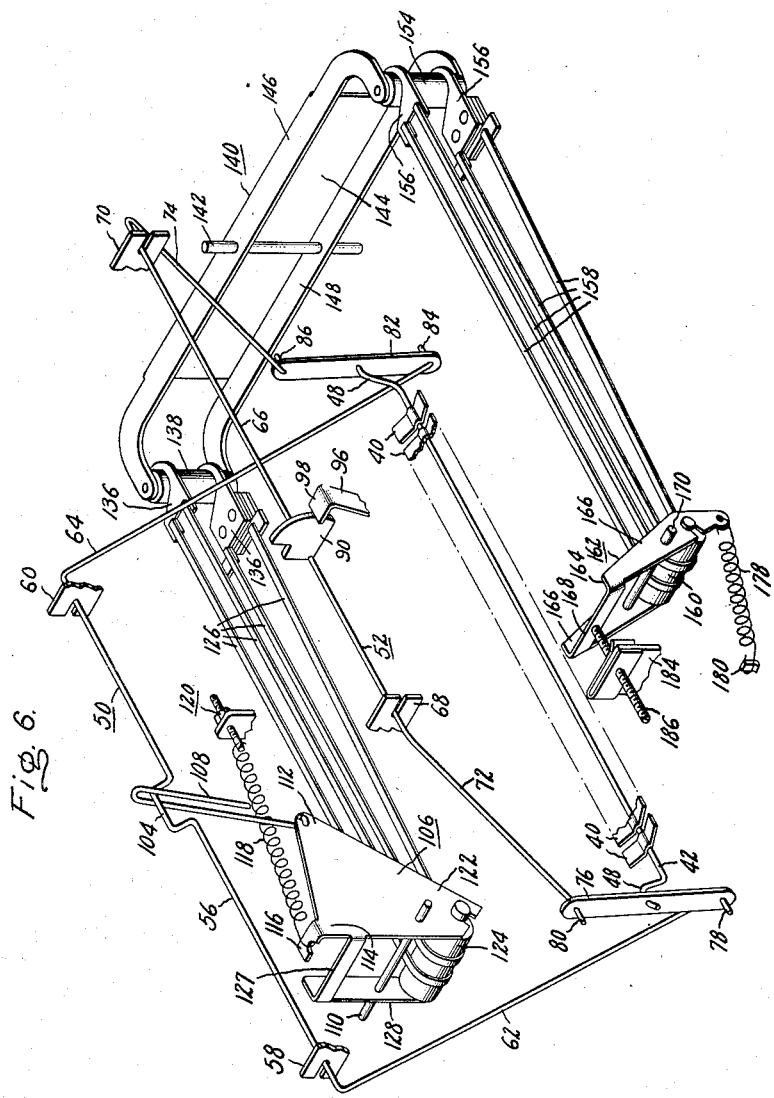
Fig. 6 is a perspective view of the bread supporting means and the improved "hot wire" drive for driving the bread supporting means, and some associated toaster parts; the bread rack is illustrated in its lower toasting position.

Referring to the drawings, the toaster generally comprises the chassis 10 and an outer ornamental shell 12, which may be supported on a surface by a plurality of feet 14. The toaster chassis 10 comprises the horizontal wall 16, which has a vertically depending skirt 18 formed around its periphery, and which supports a toasting chamber 20 on its upper side. The toasting chamber is formed by a pair of end walls 22 and 24, a pair of side walls 26 and 28, and a top wall 30 having an elongated slot 32 of a length greater than the combined width of two conventional slices of bread in tandem. The ornamental shell 12 forms no specific part of our invention and, therefore, is not shown in great detail, however, it does include a slot which corresponds to the slot 32 and which allows access to the interior of the toasting chamber.

Within the toasting chamber there are located bread guiding means and bread toasting means; these means may take various forms. The illustrated arrangement comprises an elongated heating element 34 which extends horizontally between the end walls 22 and 24 near the bottom of the toasting chamber. Heating element 34 may comprise an elongated bar of electrical insulating material having electrical resistance wire wrapped around it, and it may be appropriately wired in the toaster control circuit for energization at the proper time. Extending above and parallel to the heating element 34 is a heat baffle 36 in the form of an elongated metal plate. A plurality of bread guard wires 38 depend from the top wall 30 and are secured in any conventional manner to the heat baffle 36. It will, therefore, be apparent that within the space in the toasting chamber defined generally by the bread guard wires 38, slot 32 and the heat baffle 36, slices of bread or the like may be received for toasting.

The bread supporting means comprises a bread rack and a bread rack supporting machanism. The bread supporting means per se is not our invention, but an independent invention of Alfred E. De Mott, and is described and claimed in co-pending patent application, Serial No. 648,902, filed concurrently herewith, now Patent No. 2,870,701, issued January 27, 1959 and assigned to the assignee of the instant application. For a detailed consideration of its construction, mode of operation, and theory of operation, and some of the refinements of its design, reference should be had to referred-to patent application of Alfred E. De Mott. It should be understood, however, that the instant invention contemplates in addition to an automatic toaster having an improved "hot wire" drive, the combination of such a toaster and the illustrated bread supporting means.

The bread rack comprises an elongated horizontally extending substantially flat plate 40 which may be formed by a plurality of shallow, V-shaped members, as illustrated, and which is disposed for vertical movement in the toasting space in the toasting chamber, and has secured thereto a bread rack rod 42 which extends beyond each end of the bread rack and passes through vertical slots 44 and 46 formed respectively in the end walls 22 and 24 (see Fig. 1). The free ends 48 of the bread rack rod 42 are bent upwardly.

At each end of the toasting chamber there are located portions of the bread rack supporting mechanism which are designated control linkage assemblies; each of the control linkage assemblies comprises an arrangement of mechanical elements disposed generally in accordance with the principle of Watt's motion. The entire bread rack supporting mechanism comprises four member which provide both Watt's motion control linkage assemblies. The bread rack supporting mechanism comprises two generally similarly shaped control arms 50 and 52, each of which is generally U-shaped, and a pair of control links 76 and 82. Control arm 50 is designated as the lower control arm and includes an elongated central portion 56, which is pivotally supported near its ends by the tabs 58 and 60 which are formed on the toaster end walls 22 and 24, respectively, and a pair of control legs 62 and 64 which are generally normal to the central portion 56. The control arm 52 is designated as the upper control arm and includes a central portion 66, which is pivotally supported near its ends by tabs 68 and 70 which are formed, respectively, on the end walls 22 and 24, and a pair of control legs 72 and 74 which are generally normal to the central portion 66.

It will be apparent that the control arms 50 and 52 are supported by their associated tabs in such a manner that their central portions are spaced from and parallel to the side walls 26 and 28, respectively, of the toasting chamber, and their control legs reside in planes which are generally parallel to and spaced from the end walls 22 and 24 of the toasting chamber. The free ends of all of the control legs are bent substantially at right angles away from their associated end walls and are pivotally received in openings in their associated control links. Specifically, adjacent to the end wall 22 is disposed the control link 76 which has a pair of openings, one near each of its ends, which receive the bent free ends 78 and 80 of the control legs 62 and 72, respectively, and adjacent to the end wall 24 is disposed the control link 82 which has a pair of openings, one near each of its ends, which receive the bent free ends 84 and 86 of the control legs 64 and 74, respectively.

It should, therefore, be apparent that each control linkage assembly comprises a pair of pivotal control legs and a control link. The control links 76 and 82 each have a central opening which pivotally receives one of the bent ends 48 of the bread rack rod 42. From the construction described thus far, it will be apparent that the bread rack 40 is supported on the bread rack rod 42, which in turn has upwardly bent ends 48 which are pivotally received in central openings in the control links 76 and 82, and that the latter are supported by the bent free ends of the controls legs 62, 72 and 64, 74, respectively. Further, it will be apparent that the control arms 50 and 52 are pivotally supported in the tabs 58, 60 and 68, 70, respectively, and that pivoting of the control arms results in swinging movement of the control legs and oscillation of the control links in such a manner that the central openings of the control links describe a substantially vertical path between their lower limit of movement and their upper limit of movement. The limits of movement are illustrated in Figs. 2, 3 and 4, wherein the upper limit of movement of the control links and, therefore, of the bread rack and its rod, is illustrated in phantom lines, and the lower limit is illustrated in solid lines. It should also be apparent that by moving one or both of the control arms 50 and 52, movement of the mechanical elements of the control linkage assemblies results, which has the ultimate effect of moving the bread rack vertically up or down.

In the drawings there is illustrated a mechanism for driving the bread supporting means which is of the "hot wire" drive type. The driving mechanism illustrated is particularly effective when utilized with the described bread supporting means, because the bread rack supporting mechanism is extremely light in weight and includes a minimum of frictional resistance. It should be clearly understood however that other bread supporting means may be utilized with the improved driving mechanism. It is the illustrated driving mechanism per se which is contemplated by our invention, both taken by itself and when combined with the illustrated bread supporting means.

In the toaster illustrated in Figs. 1 through 6, the bread rack 40 is moved from its upper, non-toasting position, illustrated in phantom lines in Figs. 2, 3 and 4 and in solid lines in Fig. 1, to its lower, cooking position, illustrated in solid lines in Figs. 2, 3, 4 and 6, by the force of gravity. Therefore, in order to lower the bread rack, it is only necessary to allow the force of gravity to become operative on the bread rack, as by unlatching the bread rack supporting mechanism.

This is accomplished in the illustrated embodiment by the provision of a segmental latch 90 which is rigidly secured to the central portion 66 of the control arm 52. The latch 90 has a smooth arcuate edge 92 and a notch 94 formed at one end of its edge. Disposed adjacent to the latch 90 is a latching arm 96 which is supported at one of its ends by unlatching lever 100 and has a latching detent 98 formed at its other end. Latching arm 96 is normally biased in a direction toward the latch 90 and is operatively associated with an unlatching lever 100, which comprises an elongated bent member that is pivotally supported by a stationary upstanding portion of the toaster and has a knob 102 at its free end. The arrangement of the latch construction is such that the detent 98 is normally urged against the latch 90 by the leaf spring 91, which has one end secured to said unlatching lever and the other end biased against said upstanding portion, but may be moved away from the latch by depressing knob 102 on the lever 100.

When the bread rack is in its upper position, the detent 98 is located in the notch 94; the weight of the bread rack and its supporting mechanism is such that it is urged downwardly, but it is restrained from downward movement by the interference between the latching detent 98 and a portion of the latch 90 around the notch 94. To lower the bread rack, the latching detent 98 is moved out of the notch 94 (to the right as viewed in Fig. 3) by depressing the knob 102; the desired movement is effectuated through the linkage of the latching lever 100 and latching arm 96. When the latching detent 98 clears the arcuate edge 92, the bread rack moves downwardly because of its weight and causes the control arms to pivot in their supporting tabs, resulting in movement of the control legs and control links from their phantom line positions to their full line positions in Figs. 2, 3 and 4. The latch 90 also moves from its phantom line position to its solid line position in Fig. 3.

When the bread rack reaches its lowermost position, the bread slices are in toasting position and appropriate mechanism in the toaster energizes the heating element 34, which radiates heat energy that is reflected off the internal surfaces of the walls which form the toasting chamber, and toasts the bread. An appropriate mechanism, which may be a conventional toaster timer or the like, may be included in the toaster to de-energize the heating unit 34 after the bread is toasted, and energize the "hot wire" bread rack driving mechanism which is about to be described in detail. The bread rack driving mechanism, when energized, operates to raise the bread rack 40 from its lower position to its upper position by moving downwardly the crank 104 which is formed in the central portion 56 of the control arm 50 (see Figs. 2, 3 and 6). The downward movement of the crank 104 results in both of the control arms 50 and 52 being pivoted in their supporting tabs, and the control links 76 and 82 being moved upwardly; the overall effect of this movement is to cause the bread rack 40 to be raised from its lower position into its upper position. When the bread rack reaches its upper position, the latching detent 98 enters the notch 94, and the bread rack is latched in its upper position and the break rack driving mechanism is de-energized by appropriate mechanism.

To generally facilitate the operation of the bread rack supporting mechanism and to increase the lifting capacity of the driving mechanism, the counterbalance spring 101 is employed. One end of the counterbalance spring is secured to the tab 103 formed on the end wall 22, and the other end of the counterbalance spring is secured in the opening 105 in the control leg 62 (see Figs. 1 and 2). When the break rack is in its upper position, the counterbalance spring 101, which is in the form of a coil, is in its unstressed condition. When the bread rack is lowered, the counterbalance spring resists such movement, hence, is stressed; when the bread rack is in its lower position, the counterbalance spring biases the control leg 62 upwardly. When the bread rack driving mechanism operates to raise the bread rack, the counterbalance spring assists in raising the control leg 62 upwardly. It should, therefore, be apparent that the counterbalance spring 101 operates to dampen the drop of the bread rack when the latter is unlatched and allowed to fall from its upper position to its lower position, and that the counterbalance spring assists the bread rack driving mechanism in raising the bread rack from its lower position to its upper position.

The bread rack driving mechanism is illustrated in the toaster in Fig. 5, and in association with the bread supporting means removed from most of the remaining toaster structure in Fig. 6. The principal portions of the bread rack driving mechanism are located below the horizontal wall 16 and within the skirt 18. The bread rack driving mechanism comprises (see Fig. 2) bell crank 106, bell crank link 108, which operatively connects the bell crank to the crank 104, and associated parts for causing movement of the bell crank in a desired manner to thereby lower the bell crank link 108 at the proper time to thereby lower the crank 104 and actuate the bread rack supporting mechanism to raise the bread rack to its upper position.

The bell crank 106 is pivotally secured to the toaster chassis 10 in an opening 117 formed in one corner of the horizontal wall 16 on a pivot pin 110. The bell crank has a main portion of generally triangular configuration which falls in a generally vertical plane, and is pivoted on a horizontal axis (axis of pin 110) which falls generally between two corners of the triangle. One corner 112 of the triangle pivotally supports the lower end of the bell crank link 108; another corner 114 has a tab 116 which supports one end of a stored energy mechanism, illustrated as a coil spring and hereinafter referred to as carriage spring 118, the other end of which is rigidly, but adjustably, secured to the toaster chassis 10 by a threaded rod and nut assembly 120; the last corner 122 of the triangle supports a transverse stub shaft 124, around which are wound a set of metal drive ribbons 126. As can best be seen in Fig. 5, the main triangular portion of the bell crank 106 has a wall portion 127 extending normal thereto, and another wall portion 128 bent from portion 127 and extending generally parallel to the main triangular portion. The stub shaft 124 is rotatably mounted in appropriate openings in the main triangular portion and the portion 128 of the bell crank. It will also be observed from Fig. 5 that the bell crank 106 is pivotal relative to the toaster chassis 10 on the pivot pin 110, which is supported in tab 130 and a portion of flange 132, both of which depend from wall 16 adjacent to opening 117, and that an appropriate spacer 134 is employed in the mounting.

The free ends of the set of drive ribbons 126 are rigidly secured to hook-like connectors 136, which in turn operatively engage vertically oriented, stub shaft 138, which is supported at one side of a yoke 140. The yoke is supported on a pivot pin 142 for pivotal movement about a vertical axis. As can best be seen in Fig. 6, the yoke 140 comprises a generally vertically disposed, wall portion 144, and upper and lower U-shaped portions 146 and 148, respectively. As can best be seen in Figs. 4 and 5, the yoke 140 is supported for limited pivotal motion relative to the toaster chassis 10 on the pivot pin 142, between the lower surface of the wall 16 at one end thereof and the bracket 150, which has a flat lower wall 152 which is spaced from and parallel to the wall 16. The bracket 150 is irregularly shaped, as can be clearly seen in Figs. 4 and 5, and serves to permit mounting of the yoke 140. The other side of the yoke 140 supports a vertically oriented, stub shaft 154, which in turn operatively engages hook-like connectors 156, which are rigidly secured to the free ends of a second set of metal drive ribbons 158, which are supported about the transverse stub shaft 160, which in turn is supported by an adjustable bracket assembly 162. The stub shafts 124, 138, 154 and 160 are made of an electrical insulating material, and the drive ribbons are elongated flat strips of an electrical conducting material that has a high coefficient of expansion on being heated.

The adjustable bracket assembly 162 is located at one corner of the toaster chassis 10, and comprises a bracket member 164 and associated mounting and positioning means. The bracket member 164 comprises a pair of parallel legs 166 which support near their lower end the stub shaft 160, and the central wall portion 168. The bracket member 164 is pivotally connected to the toaster chassis 10 in opening 182 formed in one corner of the wall 16 by the horizontally extending pivot pin 170 which passes centrally through both of the legs 166 and is supported in the tab 172 and a portion of the flange 174, both which depend from the wall 16; a spacer 176 is also employed to properly mount the bracket member. A coil spring 178 of substantially less strength than carriage spring 118 has one of its ends connected to the bottom of one of the legs 166 of the bracket member 164, and its other end connected to a tab 180 that is bent out of the skirt 18. Secured to an upper surface of the wall 16 adjacent to the opening 182, through which the portions of the adjusting bracket 164 extend, is an L-shaped bracket 184. Adjusting screw 186 is mounted in a threaded opening in the upstanding leg of the bracket 184, and has a tip 188 which is adapted to contact the central wall 168 of the bracket member 164 to adjust the latter's position.

From Fig. 5 it will be observed that the yoke 140 is located on the underside of wall 16 at one end of the toaster chassis 10, that its pivot pin 142 is vertically disposed centrally of that end, and that the bell crank 106 and adjustable bracket assembly 162 are located at opposite sides of the other end of the toaster chassis. It will be observed further that whereas the entire yoke assembly and both sets of drive ribbons are located completely on the underside of the wall 16, that portions of both the bell crank 106 and adjustable bracket assembly 162 project above said wall.

The bread rack driving mechanism just described operates at the appropriate time to lower the bell crank 108 and thereby raise the bread rack in the following manner. At the time during the toasting operation when the bread rack has been moved to its lower position, the bread has been toasted, and the heating element has been de-energized by the toaster timer, the condition of the bread rack driving mechanism is as follows: The drive ribbons 126 and 158 are relatively cold and taut, in fact, they are in substantial tension, which is caused by the relatively powerful carriage spring 118, which is stressed, acting through the bell crank 106. The disposition of the parts is as illustrated in Fig. 6. At the appropriate time, that is, when it is desired to raise the bread rack, the drive ribbons are allowed to expand in response to being heated; the heating may be the result of the drive ribbons having electrical current sent through them, as is the case in the illustrated embodiment, which may occur at the same time the heating element has been de-energized, and be effected by the toaster timer. However, it is possible to heat the drive ribbons by an external source, if it is so desired. Regardless of whether the drive ribbons are directly or indirectly heated, the desired result is to cause them to expand at the proper time. The linear expansion of each set of drive ribbons is added by the yoke, which results in allowing the carriage spring 118 to contract, thereby pivoting the bell crank on its pivot pin 110, clockwise as viewed in Fig. 6, and counterclockwise as viewed in Fig. 2. Such movement has the effect of causing the corner 112 of the bell crank to move downwardly and to thereby move the bell crank link 108 and the crank 104 downwardly (see phantom line positions of these parts in Fig. 2). This causes the bread rack supporting mechanism to be actuated to raise the bread rack by pivoting the control arm 50 and, hence, the entire bread rack supporting mechanism functions to raise the bread rack.

When the bread rack reaches its upper position it is latched, by the action of the latching detent 98 entering notch 94, and the bread rack driving mechanism is de-energized by appropriate switching means and allowed to cool and resume its original position. When this occurs, the bell crank link 108 is moved upwardly to its solid line position in Figs. 2 and 3, but because of the lost motion connection between it and the crank 104, no effect on the bread rack or its supporting mechanism is made, hence, the latter remain in their upper, phantom line positions in Figs. 2 and 3; the bell crank link 108 is simply poised and ready to operatively engage the crank 104 when the bread rack is subsequently lowered to its solid line position in Figs. 2 and 3, in anticipation of thereafter engaging and lowering the crank 104 to actuate the bread rack supporting mechanism and raise the bread rack at the proper time during the next toasting sequence.

To compensate for increases in ambient temperature in the toaster which result in an increase in drive ribbon length as the toaster is used continuously without a sufficient cool down period, the initial expansion of the drive ribbons is not used to raise the bread rack. This is done to insure that the bread rack will always go all the way down regardless of the ambient temperature within the toaster. It is accomplished by providing a gap between the bell crank link 108 and the crank 104 when the toaster is cold, so that the two do not contact each other until the drive ribbons have expanded a predetermined length. This predetermined length is a little more than the maximum length that the ribbons normally attain between toasting cycles when the toaster is used continuously. In Figs. 2, 3 and 6, it will be observed that when the bread rack is in its lower position, the referred-to gap exists between the bell crank link 108 and the crank 104.

The adjustable bracket assembly 162 performs several useful functions. Its principal function is to properly align the bell crank 106 with relation to the remainder of the toaster. It will be readily understood that the bell crank 106 may be positioned by adjusting the adjusting screw 186 of the adjustable bracket assembly. The force which such adjustment creates is transmitted through the drive wires and yoke to the stub shaft 124, which is supported at one corner of the bell crank. It will be appreciated that when initially positioning the parts of the bread rack driving mechanism it is necessary to stress the carriage spring 118; this is accomplished when the parts of the bread rack driving mechanism are initially assembled. The final adjustment for positioning the bell crank 106 is effectuated by the adjustable bracket assembly and, specifically, by turning the adjusting screw 186.

It is important to position the bell crank accurately for two reasons. The first is to assure that the proper gap is provided between crank 104 and bell crank link 108 to allow for changes in ambient temperature of the toaster as was previously described. The second reason is to assure a constant torque at the crank 104 as the bread rack moves up. The force of the carriage spring 118 diminishes as the stress in the spring is relaxed and thereby results in a reduction in torque caused by the carriage spring which acts on the crank 104 through the bell crank link 108. The drop off in the force of the carriage spring, the change in the moment arm through which this force operates, and the change in the moment arm acting on the bell crank link 108, as the bell crank rotates and the bread rack moves up, are all determinable, and the bell crank may be designed so that the combination of these variables at any point during rotation of the bell crank provides approximately a constant torque at the crank 104. If this condition is to remain, and this is desirable, it is necessary that the bell crank be positioned correctly, therefore, the adjustable bracket assembly is utilized to accurately position the bell crank when the components of the bread rack driving mechanism are initially assembled at the factory. Thereafter, the adjustable bracket assembly allows for adjustment of the bell crank by a serviceman, if this should become necessary.

The adjustable bracket assembly also functions to take up unintended expansion of the drive ribbons to prevent them from sagging in the event that such expansion results from the bread rack becoming hung up due to its being jammed by warped bread or some other reason. This is effected by the over-travel spring 178 which is fastened at one of its ends to the tab 180 on the toaster chassis, and at its other end to one of the legs 166 of the adjusting bracket 164. Spring 178 is only strong enough to rotate the adjusting bracket 164 and the yoke 140 and thereby keep the drive ribbons in tension when unintended expansion of the drive ribbons occurs. Under normal operating conditions, the carriage spring 118, being substantially stronger than the overtravel spring, overpowers the latter and stresses it, and keeps the adjusting bracket 164 against the tip 188 of the adjusting screw 186.

It will be understood that various electrical wiring arrangements and control mechanisms, such as the mentioned conventional toaster timer, may be utilized to control the toaster having the improved bread rack driving mechanism in the desired manner, and that it is solely necessary that the bread rack driving mechanism be energized and de-energized at the appropriate time. The illustrated embodiment of the invention has been described as operating in such a manner that the bread rack is latched in its upper position prior to operation of the toaster. The manual actuation of the pushbutton or the like causes the unlatching of the bread rack so as to permit it to fall by the force of gravity to its lower position, and also adjusts portions of the control mechanism so as to energize the heating element. After the bread has been toasted, an appropriate timer or detector, which is part of the control mechanism, de-energizes the heating element and energizes the drive ribbons. The drive ribbons expand in response to being heated by the current flowing through them, and this results in the bread rack being elevated to its upper position by the remainder of the bread rack driving mechanism where it is latched and the drive is de-energized.

An exemplary, simplified wiring diagram is illustrated in Fig. 7 which may be employed in a toaster contemplated by the instant invention. It will there be seen that the heating element may be energized by causing the contact A to engage contact B, this will normally be simultaneously effected when the pushbutton or the like is depressed to unlatch the bread rack. The drive switch is closed when the pushbutton or the like is depressed. At the appropriate time, the drive ribbons may be energized by causing the contact A to disengage contact B and shift into engagement with contact C; this shift may be caused by the toaster timer. From the wiring diagram in Fig. 7 it will be observed that when the drive ribbons are energized, one-half of the heating element is energized also. This is for the purpose of providing electrical ballast, for normally the drive ribbons would not be expected to handle the amount of voltage that the heating element would normally require, without failing. Energization of the drive ribbons causes them to heat and expand, and results in raising of the bread rack as previously described. After the bread rack has been raised and reaches its upper position, the drive switch will be opened by appropriate switching mechanism to thereby de-energize the drive and the energized half of the heating element; on depressing, the pushbutton or the like at the start of the next toasting cycle, the drive switch is closed, the contact A is shifted into engagement with the contact B and the bread rack is unlatched.

The toaster illustrated in Figs. 1 through 7 is one contemplated by the instant invention. The instant invention also contemplates a modified toaster wherein the bread rack latching structure is eliminated, and the bread rack and its supporting mechanism, which are similar to those illustrated in Figs. 1 through 6, are in their lower position at the start of the toasting cycle and at the end of the toasting cycle as well. In such a toaster, the slices of bread are dropped into the toaster, and the toasting cycle initiated by depressing a pushbutton or the like. A similar wiring diagram to that illustrated in Fig. 7 could be employed. Depressing the pushbutton operates to close the switch AB and close the drive switch, and thereby energize the heating element. After the bread is toasted, the timer or detector causes the contact A to disengage contact B and engage contact C, thereby energizing the drive ribbons and one-half of the heating element. This results in raising the bread rack in the same manner as in the Figs. 1 through 6 modification. When the bread rack reaches its upper position, the arrangement is such that the drive switch remains closed and the drive ribbons remain energized until the bread is removed from the bread rack, as by including an element of the drive switch which is actuated by removal of the bread to open the drive switch. The opening of the drive switch results in de-energization of the drive ribbons and causes the latter to contract and results in lowering of the bread rack.

It is recognized that heretofore, bread rack driving mechanisms having so-called "hot wire" drives have been employed in toasters. To the knowledge of the applicants, all prior art, "hot wire" drives have utilized drive "wires." The instant invention contemplates the use of drive "ribbons." It has been found in practice that "drive ribbons," as distinguished from the "drive wires," heat up and cool down very rapidly. This is desirable in a toaster driving mechanism for obvious reasons. The term "ribbon" is intended to cover elongated metal strips having a non-circular cross-section, particularly those having a substantially rectangular cross-section wherein the width is substantially greater than the height and very substantially less than the length. It has been found by actual test that drive ribbons operate, i.e., heat-up and cool down, much more rapidly than previously used drive wires having a cross-section which is substantially circular. It is believed to be readily understandable that a ribbon of equal cross-section to that of a round wire will cool down more rapidly than such a wire, for it has a greater heat radiating surface area. It might not be as readily apparent as to the reason why such a ribbon heats up more rapidly than such a wire. The reason is that for a given current flow, the ribbon will not reach as high a final equilibrium temperature as the wire. The final equilibrium temperature is the limiting factor as regards the amount of current flow. Since a higher flow of current is permitted in a ribbon, due to its relatively lower equilibrium temperature for a given amount of current flow, a higher current flow can be used in a ribbon, and therefore, a more rapid heat-up results.

Prior art "hot wire" driving mechanisms are also to be distinguished from applicants' in that they utilized the "contraction" of the hot wire to raise the bread rack, whereas applicants utilize the expansion of the hot ribbon to allow the carriage spring to raise the rack. Therefore, in prior art arrangements, the amount of time necessary to raise the bread rack depends on the amount of time it takes to cool the hot wires. Since it takes longer to cool a hot wire than to heat it, prior art arrangements do not raise the rack as quickly as applicants'. As was pointed out, speed in raising the rack is very desirable, therefore, applicants' driving mechanism is superior to the prior art in this respect.

As it will be evident from the foregoing description, an improved electric toaster has been provided which satisfies the purposes and objects of this invention. It will be particularly noted that an automatic toaster has been provided wherein the entire toasting cycle is automatically effected by depressing a pushbutton. This is extremely desirable, because of the ease of operation it affords, and additionally, because it renders the toaster readily adaptable to incorporation into a combined cooking appliance of the type which is capable of performing different cooking functions, such as the one disclosed and claimed in application Serial No. 648,903, W. A. Schmall, assigned to the assignee of the instant application, and filed concurrently herewith. As will be readily appreciated, certain aspects of our invention are not limited to the particular details of construction of the example illustrated, and we contemplate that various other modifications and applications will occur to those skilled in the art. It is, therefore, our intention that the appended claims shall cover such modifications and applications as do not depart from the true spirit and scope of our invention.

What we claim as new and desire to secure by Letters Patent of the United States is:

1. In a toaster having: a toasting chamber; means for holding food to be toasted in said chamber in either a toasting position or a non-toasting position; and means for toasting said food when it is in said toasting position; the improvement comprising means for driving said food holding means from its toasting to its non-toasting position including a holding means moving portion and an expansible and contractible portion, said expansible and contractible portion being operatively connected to said holding means moving portion and normally being contracted and stressing said moving portion, said expansible and contractible portion being adapted to expand in response to being heated and the expansion of which in excess of a predetermined amount allows said moving portion of said driving means to unstress and cause movement of said holding means to its non-toasting position.

2. A device as defined in claim 1 wherein said moving portion includes a stored energy means which releases some of its energy to cause movement of said holding means on the occurrence of the predetermined amount of initial expansion and in response to further expansion of said portion.

3. A device as defined in claim 2 wherein said driving means includes a bell crank, and said stored energy means acts on one corner of said bell crank, said expansible and contractible portion acts on another corner of said bell crank and opposes release of energy from said stored energy means, and the third corner of said bell crank is operatively connected to said holding means.

4. A device as defined in claim 3 wherein the operative connection between said third corner and said holding means comprises a lost motion, mechanical connection, whereby said holding means may be held in its non-toasting position and said expansible and contractible portion allowed to contract without affecting the position of said holding means.

5. A device as defined in claim 4 wherein said lost motion connection comprises a crank and a bell crank link which are poised for operative engagement when said holding means is disposed in its toasting position, there being a gap between the contacting portions of said connection to permit limited expansion of said expansible and contractible portion up to a predetermined amount prior to closing said gap, whereby a limited amount of expansion of said expansible and contractible portion in response to an increase in the ambient temperature of the toaster is permitted without affecting the position of said holding means.

6. A device as defined in claim 1 wherein said expansible and contractible portion comprises a metal ribbon which expands rapidly on being heated to a predetermined extent.

7. A toaster comprising: a toasting chamber; a rack in said chamber for supporting food to be toasted and accessible from the exterior of said toaster; means for supporting said rack in an upper non-toasting position and a lower toasting position; means for latching said rack in its upper position and for unlatching said rack to allow it to fall by gravity to its lower position; means for toasting said food when it is in said lower position; and means for driving said rack supporting means to raise said rack from its lower position to its upper position after said food is toasted; said driving means comprising a pivotal, generally triangular, bell crank having three corners, stored energy means operatively connected to one of said corners, and an expansible and contractible means operatively connected to a second corner, said third corner being operatively connected to said rack supporting means, said stored energy means normally being stressed and exerting a force on said bell crank which tends to rotate the latter, said expansible and contractible means normally being in tension and exerting a force on said bell crank tending to rotate it in a direction which is opposite to that which the stored energy means tends to rotate it, and said stored energy means being adapted to release some of its energy on expansion of said expansible and contractible means in excess of a predetermined amount to rotate said bell crank and cause said third corner to act on said rack supporting means in such a manner as to raise said rack.

8. A device as defined in claim 7 wherein said rack supporting means comprises a pair of control linkage assemblies which support said rack at its ends, one of said assemblies being disposed adjacent each end of said toasting chamber and each assembly comprising a pair of control legs and a control link, said control legs being elongated and pivotally secured at one of their ends about a fixed point, said points being spaced, one above the other, the other ends of said control legs being pivotally secured to the ends of the control link associated with them, the parts of each assembly being disposed generally in a common plane substantially in accordance with the principle of Watt's motion, and said control links being operatively secured to the ends of said rack.

9. A device as defined in claim 8 wherein said rack supporting means includes a crank and said third corner supports a bell crank link that has a lost motion connection with said crank, whereby on actuation of said driving means, expansion of said expansible and contractible means is effected and results in rotation of said bell crank, due to energy being released by said stored energy means, and such rotation causes said bell crank link to move generally linearly and operate said crank after a predetermined amount of motion so as to actuate said control linkage assemblies to raise said rack.

10. A device as defined in claim 7 wherein said expansible and contractible means comprises a pair of sets of drive ribbons which are spaced and parallel, one end of one set being pivotally connected to an end of a pivotal yoke, the other end of said one set being fixed, one end of the other set being pivotally connected to the other end of said yoke, and the other end of said other set being connected to said second corner of said bell crank, whereby on being heated, said sets expand linearly, the linear expansion of each set is added and is effective at said second corner, and on the added linear expansion exceeding said predetermined amount, said stored energy means is allowed to release sufficient energy to rotate said bell crank and raise said rack.

11. A device as defined in claim 10 wherein said other end of said one set is connected to an adjusting bracket having means to alter the location of the connection to thereby alter the tension on said sets of ribbons and the force exerted by said ribbons on said bell crank.

12. A toaster comprising: a toaster chamber; a rack in said chamber for supporting food to be toasted and accessible from the exterior of said toaster; means for supporting said rack in an upper non-toasting position and a lower toasting position; means for latching said rack in its upper position and for unlatching said rack to allow it to fall by gravity to its lower position; means for toasting said food when it is in said lower position; and means for driving said rack supporting means to raise said rack from its lower position to its upper position after said food is toasted; said driving means comprising a pivotal bell crank, stored energy means normally being stressed and exerting a force on said bell crank which tends to rotate the latter, and expansible and contractible means normally being in tension and exerting a force on said bell crank tending to rotate it in a direction which is opposite to that which the stored energy means tends to rotate it, said stored energy means being adapted to release some of its energy on expansion of said expansible and contractible means in excess of a predetermined amount to rotate said bell crank and cause said rack supporting means to raise said rack.

13. A device as defined in claim 12 wherein said expansible and contractible means comprises an electric current carrying, metal ribbon which expands rapidly on being heated to a predetermined extent in response to current flowing through it.

14. A device as defined in claim 12 wherein said driving means includes adjusting means for altering the tension on said expansible and contractible means to alter the force acting on said bell crank which opposes the force of said stored energy means to thereby alter the initial disposition of said bell crank.

15. A device as defined in claim 14 wherein said adjusting means includes an over-travel, stored energy means of less power than the first-mentioned stored energy means, whereby slack in said expansible and contractible means is taken up by said over-travel, stored energy means if and when said expansible and contractible means expands and for some reason, such as the inadvertent jamming of said bread rack, said bell crank is unable to rotate.

References Cited in the file of this patent

UNITED STATES PATENTS

| | | |
|---|---|---|
| 2,132,622 | Ireland | Oct. 11, 1938 |
| 2,271,485 | Koci | Jan. 27, 1942 |
| 2,624,269 | Hild | Jan. 6, 1953 |
| 2,667,828 | Koci | Feb. 2, 1954 |
| 2,692,549 | Olson | Oct. 26, 1954 |